T. S. Hudson.

Barometer Inkstand.

No. 2,607. Reissued May 14, 1867.

Witnesses.

Melville Biggs
W. L. Bennett

Inventor.

Thomas. S. Hudson
by his attorney

United States Patent Office.

THOMAS S. HUDSON, OF EAST CAMBRIDGE, MASSACHUSETTS.

*Letters Patent No.* 32,498, *dated June* 4, 1861; *reissue No.* 1,820, *dated November* 15, 1864; *reissue No.* 2,607, *dated May* 14, 1867.

IMPROVEMENT IN BAROMETER INKSTANDS.

The Schedule referred to in these Letters Patent and making part of the same.

TO ALL PERSONS TO WHOM THESE PRESENTS SHALL COME:

Be it known that I, THOMAS S. HUDSON, of East Cambridge, in the county of Middlesex, and State of Massachusetts, have invented an improved Barometric Inkstand; and I do hereby declare that the following is a full, clear, and exact description of my invention.

The object of the invention which constitutes the subject-matter of this patent is to obtain a good fountain inkstand at a low cost, and the first part of it consists of the combination of the following parts, viz, a dip-basin for the reception of the pen, an ink-cistern elevated above the dip-basin, a hollow extension or arm connecting the ink-cistern and dip-basin, and a shell-base which holds the ink-cistern, dip-basin, and arm, and which may be made of thin metal and filled in with a cheap cement, such as plaster of Paris, so that a fountain inkstand, with a broad, hard-surfaced base is obtained at a small expense.

The special object of the next part of the invention is to secure the dip-basin and its connections to the base more solidly than if the cement in the base were alone relied on for that purpose, and it consists of the combination of the aforesaid dip-basin, ink-cistern, hollow arm, and shell-base by means of a collar secured to the said dip-basin above the shell-base, so that the said collar prevents the dip-basin and its connections from being withdrawn in a downward direction from the shell-base.

The special object of the next part of the invention is to enable the ink-cistern to be readily filled, and consists of the combination of the dip-basin, ink-cistern, hollow connecting-arm, and base holding the same, with a tunnel-cup applied to the dip-basin, so that when the inkstand is turned, for the purpose of filling, to such position that the hollow arm is erect, or thereabouts, the said tunnel-cup is in a proper position to receive ink and direct it into the dip-basin.

The special object of the next part of the invention is to provide convenient means for closing the dip-basin of my inkstand, and consists of the combination of the dip-basin, ink-cistern, hollow connecting-arm, and base holding the same, with a cover for the dip-basin.

All the parts of my invention are contained in the inkstand represented in the accompanying drawings, in which—

Figure 1:
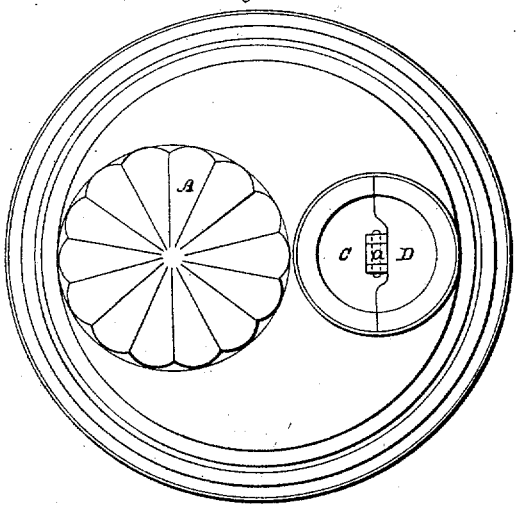

Figure 1 is a top view of the inkstand constructed according to my invention.

Figure 2:
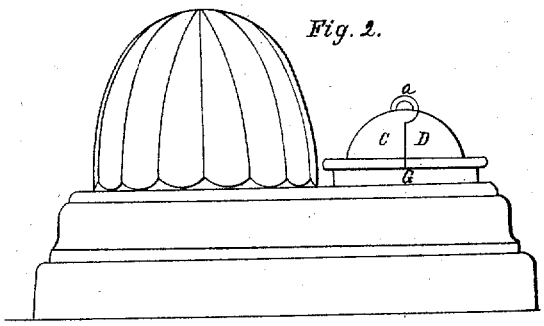

Figure 2, a side elevation of the same.

Figure 3:
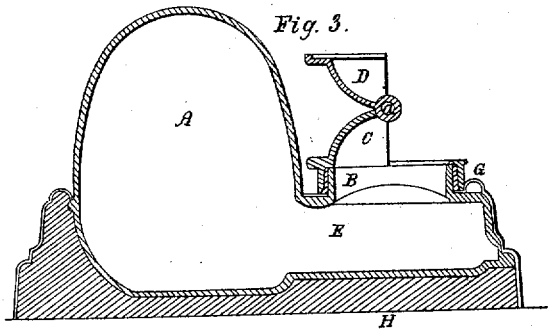

Figure 3 is a longitudinal section of it; and

Figure 6:
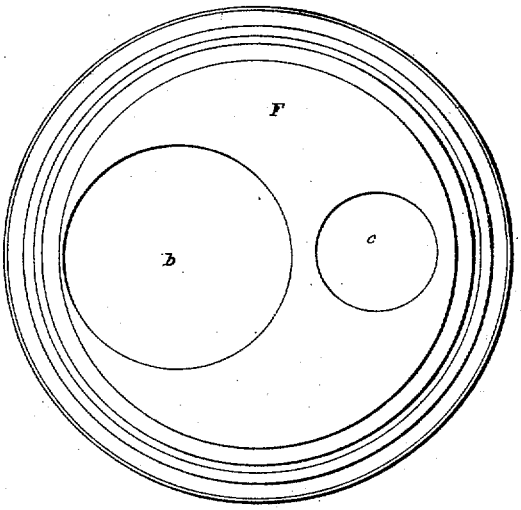
Figure 4:
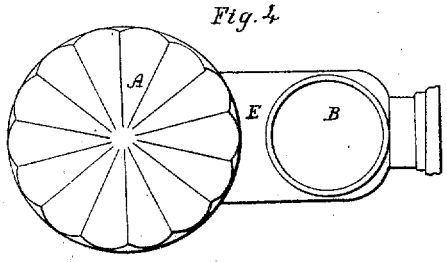
Figure 5:
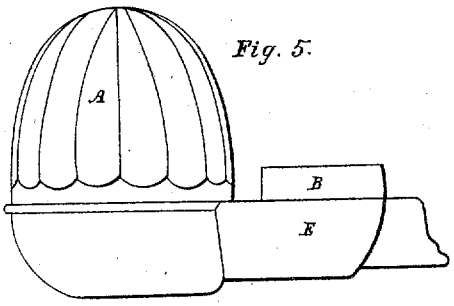

Figures 4, 5, and 6 are views of detached parts of the inkstand.

This inkstand has an air and ink-cistern, A, elevated above the opening or mouth of the dip-basin B for the reception of a pen. The said cistern and the dip-basin B are connected by a hollow extension or arm, E, which projects horizontally from the side of the cistern, and opens out of the cistern and into the dip-basin, the whole, cistern, neck, and hollow arm, being made or cast in one piece of glass, the same being formed as shown in top view in fig. 4, and in side elevation in fig. 5, and in longitudinal section in fig. 3. An inverted disk or case, F, formed of sheet metal, as shown in top view in fig. 6, in side elevation in fig. 2, and in transverse section in fig. 3, has two circular apertures *b c* made through its top, one being for the reception of the dip-basin B, and the other being for the reception of the dome of the cistern A, when the said cistern, the arm E, the dip-basin B, and the case F are arranged as represented in figs. 1, 2, and 3. This case forms the shell-base of the inkstand. Furthermore, the mouth of the dip-basin B is constructed with a quarter spherical stationary tunnel-cup, C, such cup, as shown in the drawings, being extended upward from an annular collar, G, encompassing and cemented to that part of the dip-basin B which projects above the top surface of the base F. This collar serves to confine or aid in confining the said base F to the glass cistern, its dip-basin and arm, they being further confined together by a mass of plaster of Paris or cement, H, run into the base so as to fill the space about the parts within it. The tunnel-cup and the mouth of the inkstand are provided with a quarter spherical cover, D, hinged to the upper part of the said cup, as shown at *a*, and so that the said cover may be turned upward from the position shown in figs. 1 and 2 into that represented in fig. 3. The semi-dome or tunnel-cup C, projecting as it does beyond the mouth part B, enables ink to be poured to advantage into the said mouth when the inkstand is in such position that its mouth shall be upward and the plane of its bottom be vertical, or about so, in which case the ink may be poured into the inkstand until such ink may reach the level of the upper edge of the half-dome. The fountain or cistern A, as well as part of the dip-basin B, will then be full of ink. On the inkstand being turned into a position so as to bring its bottom horizontal, the ink will remain in the fountain or cistern A, and by the pressure of the atmosphere will be maintained therein at a level above the mouth of the dip-basin B. Without the semi-dome C the inkstand can neither be supplied with ink to so great a degree or so advantageously as it can when provided with such semi-dome. The application of the metallic shell-base or stand to the glass portion of the inkstand and connecting them with an annular collar applied to the mouth of the dip-basin are believed to be both novel and highly useful, the former furnishing a broad, hard-surfaced base at a low cost, and the latter operating to prevent downward pressure on the cistern from displacing the cement or plaster within the base F; and furthermore, the cement or plaster operates as a preventive to displacement of the collar from the neck as well as to impart solidity and weight to the base.

What I claim as my invention, and desire to secure by Letters Patent, is—

The improved barometric inkstand, consisting of the combination of the dip-basin, elevated ink-cistern, hollow connecting-arm, and shell-base, substantially as before set forth.

I also claim the combination of the dip-basin, elevated ink-cistern, hollow connecting-arm, and base, with a collar secured to the dip-basin, substantially as before set forth.

I also claim the combination of the dip-basin, elevated ink-cistern, hollow connecting-arm, and base, with a tunnel-cup, substantially as before set forth.

I also claim the combination of the dip-basin, elevated ink-cistern, hollow connecting-arm, and base, with a cover for the dip-basin, substantially as before set forth.

In testimony whereof I have hereto set my hand this third day of April, A. D. 1867.

THOS. S. HUDSON.

Witnesses:

E. S. RENWICK,

WM. L. BENNEM.